United States Patent
Malakian et al.

(10) Patent No.: US 7,798,043 B1
(45) Date of Patent: Sep. 21, 2010

(54) WEIGHT DISCRIMINATION OF COLLIDING BALLISTIC OBJECTS

(75) Inventors: Kourken Malakian, Mount Laurel, NJ (US); Stephen J. Salvatore, Mount Laurel, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 322 days.

(21) Appl. No.: 12/107,522

(22) Filed: Apr. 22, 2008

(51) Int. Cl.
*F41H 13/00* (2006.01)
*G01G 19/03* (2006.01)
*G01G 19/07* (2006.01)

(52) U.S. Cl. ........................................ 89/1.11; 702/175
(58) Field of Classification Search ............ 89/1.11, 89/1.8, 36.01; 342/67; 244/3.1; 702/173, 702/175
See application file for complete search history.

(56) References Cited

U.S. PATENT DOCUMENTS

| | | | |
|---|---|---|---|
| 5,153,366 A | * | 10/1992 | Lucas ........................ 89/1.11 |
| 5,757,310 A | | 5/1998 | Millward |
| 6,467,388 B1 | * | 10/2002 | Malakatas ................. 89/41.03 |
| 6,497,169 B1 | * | 12/2002 | Khosla ....................... 89/1.11 |
| 6,739,547 B2 | | 5/2004 | Redano |
| 7,121,183 B2 | * | 10/2006 | Waid et al. ................. 89/1.11 |

* cited by examiner

*Primary Examiner*—Bret Hayes
(74) *Attorney, Agent, or Firm*—Duane Morris LLP

(57) ABSTRACT

When a kinetic kill vehicle is launched against an incoming ballistic object and the two objects collide, by measuring the deflection angle of the trajectory of the merged object and comparing the deflection angle against a threshold value, a determination is made as to the relative weight of the incoming ballistic object and whether or not the incoming ballistic object is a decoy and not the warhead.

14 Claims, 6 Drawing Sheets

US 7,798,043 B1

WEIGHT DISCRIMINATION OF COLLIDING BALLISTIC OBJECTS

GOVERNMENTAL INTEREST

This invention was made with government support under Contract N00024-03-C-6110 awarded by the Department of the Navy. The United States Government has certain rights in this invention.

CROSS-REFERENCE TO RELATED APPLICATION

This disclosure relates to methods and systems for intercepting an object traveling in ballistic trajectory.

FIELD OF THE INVENTION

None

BACKGROUND

One of the challenges of defending against ballistic missiles is that some ballistic missiles may deploy a plurality of decoys during the reentry phase of the ballistic flight. Although the decoys are detectible by radar they are not distinguishable from the warhead based on the radar track data alone. One method of defending against such a ballistic missile involves launching multiple kinetic kill vehicles to intercept many of the incoming ballistic objects, so that at least one of which will be a warhead and others being decoys. However, because a large number of decoys are deployed by a ballistic missile, it is not practical to intercept every incoming object and only some are intercepted. Thus, when kinetic kill vehicles intercept one or more incoming ballistic objects deployed by a ballistic missile, it would be beneficial to automatically determine if the intercepted ballistic object is not the warhead. That would allow appropriate follow-on actions to be taken.

SUMMARY

According to an embodiment of the present disclosure, a method for determining the relative weight of an incoming ballistic object with respect to a predefined weight value, said incoming ballistic object moving in a ballistic trajectory, is disclosed. The method comprises launching at least a second object of a known weight toward the incoming ballistic object, thereby resulting in the two objects colliding at a strike angle and producing a merged object traveling on a second ballistic trajectory that is deflected from the first ballistic trajectory of the ballistic object by a deflection angle. Immediately before the collision, pre-collision track data is collected where the pre-collision track data comprises velocity vectors of the incoming ballistic object and the second object immediately prior to the ballistic object and the second object collide. After the collision, post-collision track data is collected where the post-collision track data comprises observed filtered velocity vector of the merged object after the collision. Next, the deflection angle of the second ballistic trajectory of the merged object is determined based on the pre-collision and post-collision track data and then, the strike angle is determined based on the pre-collision track data. Next, a threshold value for the deflection angle is determined based on the strike angle and said predefined weight value. The relative weight of the incoming ballistic object is determined by comparing the deflection angle with the threshold value and an appropriate follow-on action is taken based on the determination of the relative weight of the incoming ballistic object.

According to another embodiment, a method for determining whether or not an incoming ballistic object moving in a ballistic trajectory is heavier than a predefined weight value is disclosed. The method comprises launching at least a second object of known weight toward the ballistic object, thereby resulting in the two objects colliding at a strike angle and producing a merged object traveling on a second ballistic trajectory that is deflected from the first ballistic trajectory of the ballistic object by a deflection angle. Immediately before the two objects collide, pre-collision track data comprising velocity vectors of the ballistic object and the second object is collected. Post-collision track data is collected after the collision. The post-collision track data comprises the observed filtered velocity vector of the merged object. From the pre-collision and post-collision track data, the deflection angle of the second ballistic trajectory of the merged object is determined and the strike angle is determined from the pre-collision track data. Then, a threshold value of the deflection angle is determined based on the strike angle and the predefined weight value and by comparing the deflection angle with the threshold value, a determination is made as to whether or not the ballistic object was a decoy and not the warhead and an appropriate follow-on action is taken.

BRIEF DESCRIPTION OF THE DRAWINGS

These and other features and advantages of the present invention will be more fully disclosed in the following detailed description, which is to be considered together with the accompanying drawings wherein like numbers refer to like parts, and further wherein.

DETAILED DESCRIPTION

Figure 1:
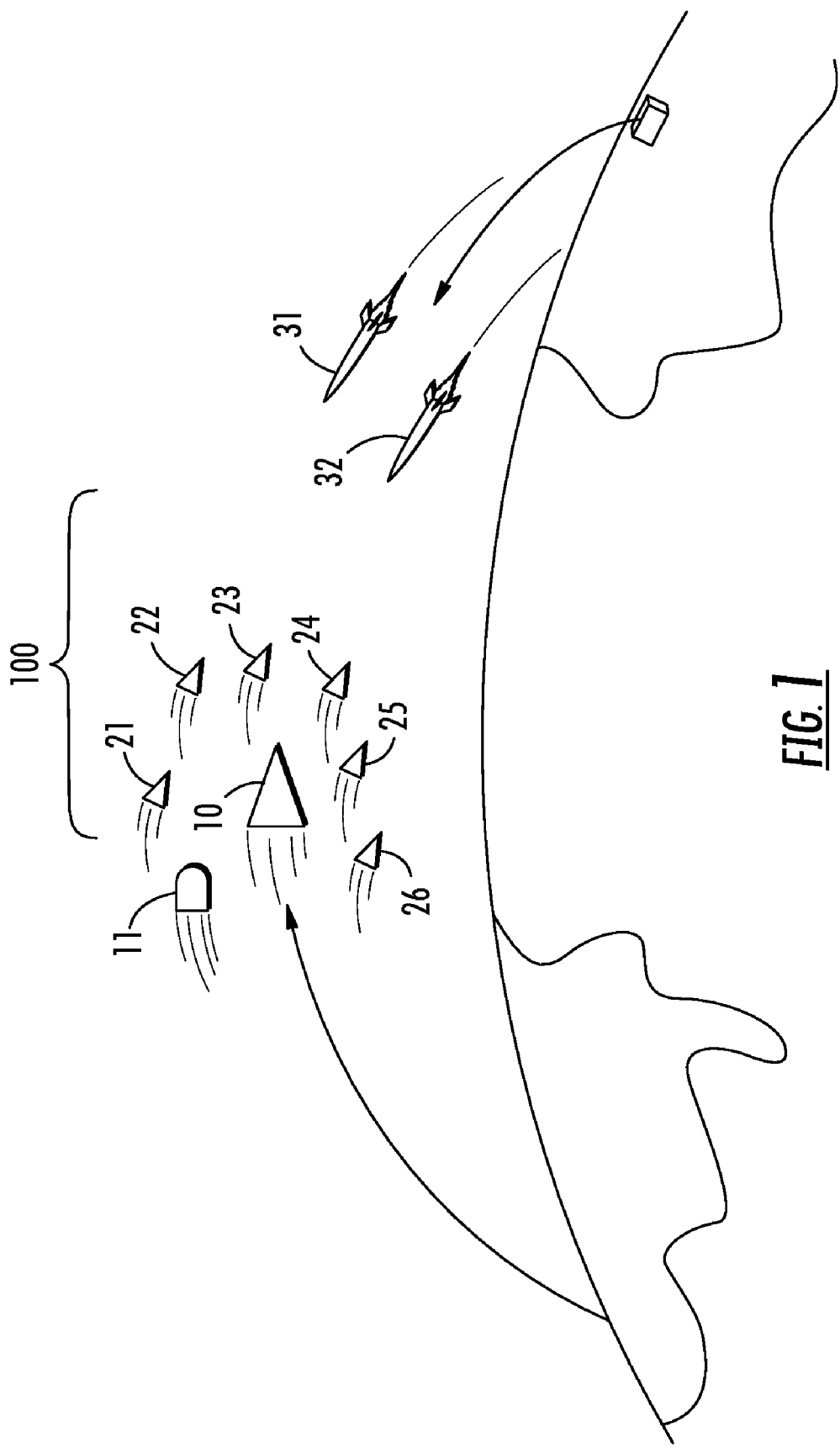
FIG. 1 is a schematic diagram illustrating a scenario in which one or more kinetic kill vehicles have been launched to intercept an incoming ballistic target complex.

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

FIG. 1 illustrates an example of a scenario in which the method of the present disclosure can be implemented in a useful way, in this ballistic missile defense application example. A target complex 100 comprising multiple incoming ballistic objects is shown with one or more kinetic kill vehicles 31 and 32 of known weights that have been launched to intercept a warhead 10 that is among the multiple incoming ballistic targets. The target complex 100 comprises an incoming ballistic missile that has deployed a plurality of decoys 21-26 and the warhead 10, collectively the incoming ballistic objects. Because the target complex 100 comprises a greater number of incoming ballistic objects then the kinetic kill vehicles 31 and 32, only a select number of the ballistic objects in the target complex 100 are targeted to be intercepted by the kinetic kill vehicles 31 and 32 with the desired objective being intercepting the warhead 10.

However, although the ballistic objects in the target complex 100 can be detected by a radar, because all of the incoming ballistic objects comprising the target complex 100 have substantially the same velocity and radar signatures, the warhead 10 is not necessarily distinguishable from the decoys 21-26 based on the radar information. The method of the present disclosure allows determining whether or not the incoming ballistic object intercepted by a given kinetic kill vehicle was the warhead 10 based on general condition that the warhead 10 is substantially heavier than the decoys 21-26. Given that condition, acquisition of the pre-collision and post-collision dynamics of the two objects, the kinetic kill vehicle and the incoming ballistic object, allows determination as to whether the warhead 10 has been intercepted.

Still referring to FIG. 1, according to another aspect of the present disclosure, the target complex 100 can also include one or more objects 11 (only one shown for illustrative purposes) that are also heavier than the decoys 21-26 but can have a weight similar to or different than warhead 10. The method of the present disclosure can be applied to determine whether the warhead 10 has not been intercepted and one of the decoys 21-26 has been intercepted by a given kinetic kill vehicle. This will be elaborated further below.

Figure 2:
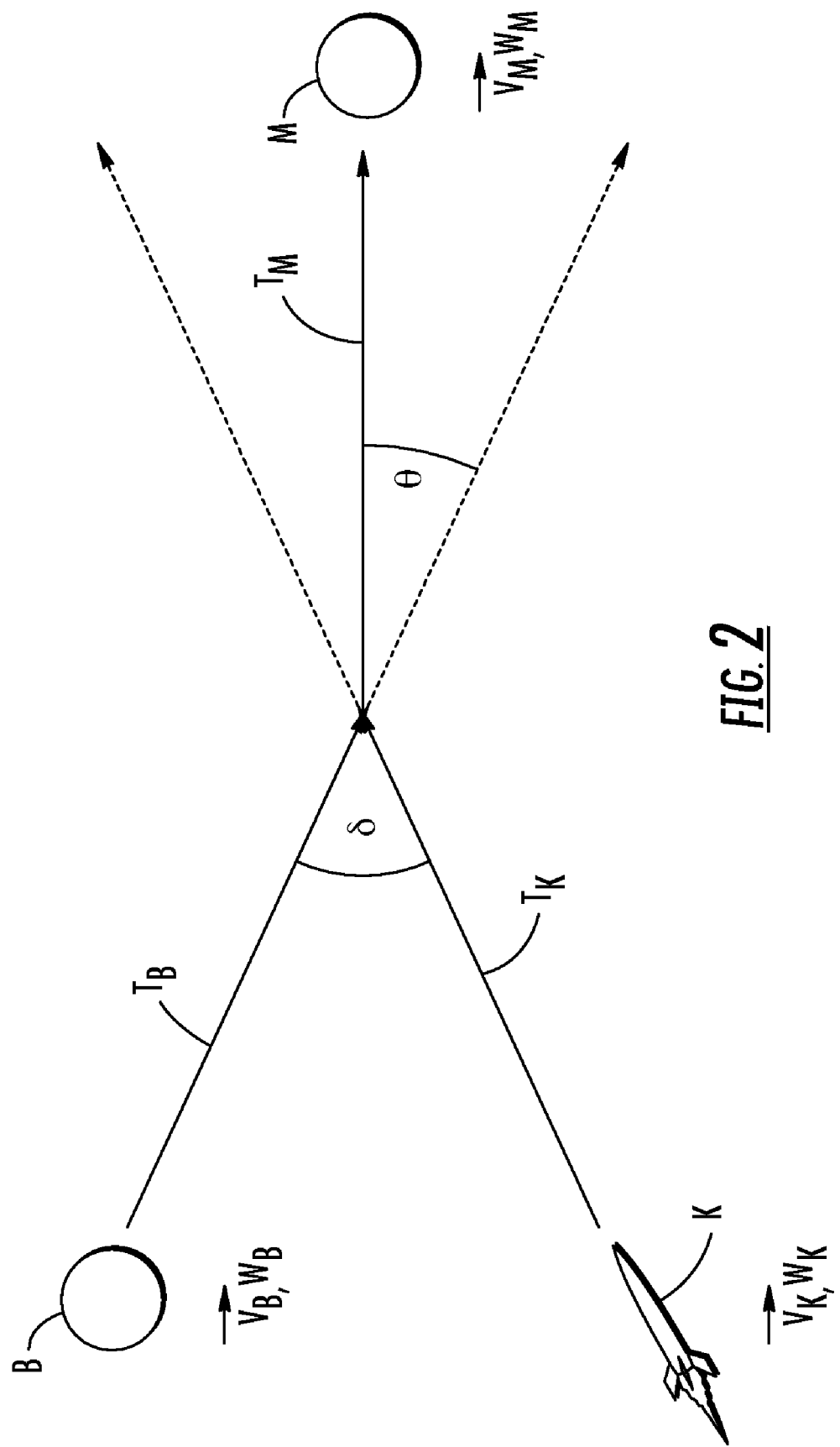
FIG. 2 is a schematic diagram of a kinetic kill vehicle intercepting and colliding with an incoming ballistic object illustrating the method of the present disclosure.

Referring to FIG. 2, the method of discriminating the incoming ballistic object B intercepted by a given kinetic kill vehicle K of a known weight according to an embodiment will be described. A characteristic of the decoys 21-26 among the incoming ballistic objects comprising the target complex 100 is that they are substantially lighter than the warhead 10. This is also a characteristic shared by the kinetic kill vehicles 31, 32 and K. In other words, the kinetic kill vehicles are also substantially lighter than the warhead 10. Since kinetic kill vehicles are known objects launched against the incoming ballistic objects, the weight of each of the kinetic kill vehicles are always known. The method of the present disclosure utilizes this substantial difference in the weight between the warhead, decoys, and the kinetic kill vehicle to determine whether or not the kinetic kill vehicle intercepted the warhead based on measured parameters of the post-collision dynamics. In cases where the kinetic kill vehicle is a self-propelled object carrying fuel, the fuel remaining on-board the kinetic kill vehicle at the time of the collision is factored into the calculations concerning the pre-collision and post-collision dynamics. For example, the estimated weight of the remaining fuel on-board can be added to the known net weight of the kinetic kill vehicle.

According to an embodiment, the collision between the kinetic kill vehicle K and the incoming ballistic object B of unknown weight is assumed to be an inelastic collision with total absorption. The incoming ballistic object B is traveling in a trajectory $T_B$ and has a velocity $\vec{V}_B$ and weight $W_B$. The kinetic kill vehicle K is traveling in a trajectory $T_K$ and has a velocity $\vec{V}_K$ and weight $W_K$. The incoming ballistic object B and the kinetic kill vehicle K collide at a strike angle $\delta$. Through the inelastic collision, the incoming ballistic object B and the kinetic kill vehicle K merge into a merged object M. The merged object M has a velocity $\vec{V}_M$ and weight $W_M$ and travels along a trajectory $T_M$ that has been deflected from the trajectory $T_B$ of the incoming ballistic object B by a deflection angle $\theta$.

The incoming ballistic object B and the kinetic kill vehicle K are monitored and tracked by a radar and thus the velocity $\vec{V}_B$ of the incoming ballistic object B and the velocity $\vec{V}_K$ of the kinetic kill vehicle K before the collision, hereinafter referred to as the pre-collision track data, are collected. The velocity $\vec{V}_M$ of the merged object M after the collision, the post-collision track data, is measured and collected by the radar. Because the weight $W_K$ of the kinetic kill vehicle K is a known quantity, by measuring the velocities of the two colliding objects before the collision, the velocity $\vec{V}_M$ of the merged object M and its deflected angle $\theta$, one can determine whether or not the incoming ballistic object B was one of the decoys 21-26 and not the warhead 10, which is substantially heavier than the kinetic kill vehicle K. In a first scenario where the collision is with the warhead 10, because the warhead 10 is substantially heavier than the kinetic kill vehicle K, the deflected angle $\theta$ will be small. Whereas, in a second scenario, where the collision is with one of the decoys 21-26, whose weights are substantially less than the weight of the warhead 10, the deflected angle $\theta$ will be much larger. Therefore, by setting a threshold value for the deflected angle $\theta$ and comparing the measured deflection angle $\theta$ to the threshold value, the nature of the incoming ballistic object B can be determined. If the measured deflection angle $\theta$ is less than the threshold value, the incoming ballistic object B was the heavy object 11 or the warhead 10. If the measured deflection angle $\theta$ is greater than the threshold value, the incoming ballistic object B was a decoy.

The deflection angle $\theta$ can be computed from the velocities measured from the radar. The deflection angle $\theta$ is given by $$\theta = \cos^{-1}\left(\frac{\vec{V}_M \cdot \vec{V}_B}{|\vec{V}_M||\vec{V}_B|}\right)$$

where $\vec{V}_B = (V_B(1), V_B(2), V_B(3))$ is the velocity vector of the incoming ballistic object B at the collision, $\vec{V}_K = (V_K(1), V_K(2), V_K(3))$ is the velocity vector of the kinetic kill vehicle K at the collision, $\vec{V}_M = (V_M(1), V_M(2), V_M(3))$ is the observed filtered velocity vector of the merged object M after collision given by $$\vec{V}_M = \vec{V}_K W_B + \vec{V}_B W_K$$

with $$W_B = \frac{w_K}{w_B + w_K}, \text{ and}$$

$$W_K = \frac{w_B}{w_B + w_K},$$

where $w_B$ = weight of the incoming ballistic object B and $w_K$ = weight of the kinetic kill vehicle K.

Next, in order to compensate for the radar measurement errors in the observed deflection angle $\theta$, the error standard deviation of the deflection angle is determined. The error standard deviation $\sigma_\theta$ of the deflection angle $\theta$ can be expressed as $$\sigma_\theta = \sqrt{\csc^2(\theta)\sigma_R^2},$$

where $$\sigma_R^2 = \left(\frac{\partial R}{\partial V_M(1)}\right)^2 \sigma_{V_M}(1)^2 + \left(\frac{\partial R}{\partial V_M(2)}\right)^2 \sigma_{V_M}(2)^2 + \left(\frac{\partial R}{\partial V_M(3)}\right)^2 \sigma_{V_M}(3)^2 + 2\left(\frac{\partial R}{\partial V_M(1)}\right)\left(\frac{\partial R}{\partial V_M(2)}\right)\sigma_{V_M}(1,2) + 2\left(\frac{\partial R}{\partial V_M(1)}\right)\left(\frac{\partial R}{\partial V_M(3)}\right)\sigma_{V_M}(1,3) + 2\left(\frac{\partial R}{\partial V_M(2)}\right)\left(\frac{\partial R}{\partial V_M(3)}\right)\sigma_{V_M}(2,3) + \left(\frac{\partial R}{\partial V_B(1)}\right)^2 \sigma_{V_B}(1)^2 + \left(\frac{\partial R}{\partial V_B(2)}\right)^2 \sigma_{V_B}(2)^2 + \left(\frac{\partial R}{\partial V_B(3)}\right)\sigma_{V_B}(3)^2 + 2\left(\frac{\partial R}{\partial V_B(1)}\right)\left(\frac{\partial R}{\partial V_B(2)}\right)\sigma_{V_B}(1,2) + 2\left(\frac{\partial R}{\partial V_B(1)}\right)\left(\frac{\partial R}{\partial V_B(3)}\right)\sigma_{V_B}(1,3) + 2\left(\frac{\partial R}{\partial V_B(2)}\right)\left(\frac{\partial R}{\partial V_B(3)}\right)\sigma_{V_B}(2,3) + 2\left[\left(\frac{\partial R}{\partial V_M(1)}\right)\left(\frac{\partial R}{\partial V_B(1)}\right)W_K \sigma_{V_B}(1)^2 + \left(\frac{\partial R}{\partial V_M(1)}\right)\left(\frac{\partial R}{\partial V_B(2)}\right)W_K\sigma_{V_B}(1,2) + \left(\frac{\partial R}{\partial V_M(1)}\right)\left(\frac{\partial R}{\partial V_B(3)}\right)W_K\sigma_{V_B}(1,3) + \left(\frac{\partial R}{\partial V_M(2)}\right)\left(\frac{\partial R}{\partial V_B(1)}\right)W_K\sigma_{V_B}(1,2) + \left(\frac{\partial R}{\partial V_M(2)}\right)\left(\frac{\partial R}{\partial V_B(2)}\right)W_K\sigma_{V_B}(2)^2 + \left(\frac{\partial R}{\partial V_M(2)}\right)\left(\frac{\partial R}{\partial V_B(3)}\right)W_K\sigma_{V_B}(2,3) + \left(\frac{\partial R}{\partial V_M(3)}\right)\left(\frac{\partial R}{\partial V_B(1)}\right)W_K\sigma_{V_B}(1,3) + \left(\frac{\partial R}{\partial V_M(3)}\right)\left(\frac{\partial R}{\partial V_B(2)}\right)W_K\sigma_{V_B}(2,3) + \left(\frac{\partial R}{\partial V_M(3)}\right)\left(\frac{\partial R}{\partial V_B(3)}\right)W_K\sigma_{V_B(3)^2}\right] \text{ with } R = \frac{\vec{V}_M \cdot \vec{V}_B}{|\vec{V}_M||\vec{V}_B|},$$

$$\sigma_{V_M}(1)^2 = W_B^2 \sigma_{V_K}(1)^2 + W_K^2 \sigma_{V_B}(1)^2,$$

$$\sigma_{V_M}(2)^2 = W_B^2 \sigma_{V_K}(2)^2 + W_K^2 \sigma_{V_B}(2)^2,$$

$$\sigma_{V_M}(3)^2 = W_B^2 \sigma_{V_K}(3)^2 + W_K^2 \sigma_{V_B}(3)^2,$$

$$\sigma_{V_M}(1,2) = W_B^2 \sigma_{V_K}(1,2) + W_K^2 \sigma_{V_B}(1,2),$$

$$\sigma_{V_M}(1,3) = W_B^2 \sigma_{V_K}(1,3) + W_K^2 \sigma_{V_B}(1,3), \text{ and}$$

$$\sigma_{V_M}(2,3) = W_B^2 \sigma_{V_K}(2,3) + W_K^2 \sigma_{V_B}(2,3).$$

Then, by letting $$u_M = \sqrt{V_M(1)^2 + V_B(2)^2 + V_B(3)^2},$$

$$u_B = \sqrt{V_B(1)^2 + V_B(2)^2 + V_B(3)^2},$$

$$a = V_M(1)V_B(1) + V_M(2)V_B(2) + V_M(3)V_B(3),$$

$$b = u_M u_B,$$

$$c = \frac{u_B}{u_M}, \text{ and}$$

$$d = \frac{u_M}{u_B}$$

the partial terms are computed as $$\frac{\partial R}{\partial V_M(1)} = \frac{V_B(1)b - V_M(1)ca}{b^2},$$

$$\frac{\partial R}{\partial V_M(2)} = \frac{V_B(2)b - V_M(2)ca}{b^2},$$

$$\frac{\partial R}{\partial V_M(3)} = \frac{V_B(3)b - V_M(3)ca}{b^2},$$

$$\frac{\partial R}{\partial V_B(1)} = \frac{V_M(1)b - V_B(1)da}{b^2},$$

$$\frac{\partial R}{\partial V_B(2)} = \frac{V_M(2)b - V_B(2)da}{b^2}, \text{ and}$$

$$\frac{\partial R}{\partial V_B(3)} = \frac{V_M(3)b - V_B(3)da}{b^2}.$$

Next, the covariance is given by $$C_{V_B} = \vec{\hat{r}}_B \vec{\hat{r}}_B^T \sigma_{\hat{r}_B}^2 + \left(I - \vec{\hat{r}}_B \vec{\hat{r}}_B^T\right)\sigma_{\hat{a n g}_B}^2 = \begin{pmatrix} \sigma_{V_B}(1)^2 & \sigma_{V_B}(1,2) & \sigma_{V_B}(1,3) \\ \sigma_{V_B}(2,1) & \sigma_{V_B}(2)^2 & \sigma_{V_B}(2,3) \\ \sigma_{V_B}(3,1) & \sigma_{V_B}(3,2) & \sigma_{V_B}(3)^2 \end{pmatrix}, \text{ and}$$

$$C_{V_K} = \vec{\hat{r}}_K \vec{\hat{r}}_K^T \sigma_{\hat{r}_K}^2 + \left(I - \vec{\hat{r}}_K \vec{\hat{r}}_K^T\right)\sigma_{\hat{a n g}_K}^2 = \begin{pmatrix} \sigma_{V_K}(1)^2 & \sigma_{V_K}(1,2) & \sigma_{V_K}(1,3) \\ \sigma_{V_K}(2,1) & \sigma_{V_K}(2)^2 & \sigma_{V_K}(2,3) \\ \sigma_{V_K}(3,1) & \sigma_{V_K}(3,2) & \sigma_{V_K}(3)^2 \end{pmatrix}$$

where
$\sigma_{V_B}(1)^2$, $\sigma_{V_B}(2)^2$, $\sigma_{V_B}(3)^2$ represent the ballistic object filter velocity error variance in x, y, and z respectively, and
$\sigma_{V_B}(1,2)$, $\sigma_{V_B}(2,3)$, $\sigma_{V_B}(1,3)$ represent the ballistic object filter velocity error cross-covariance for xy, yz, and xz respectively.

In addition $$\sigma_{V_B}(1,2) = \sigma_{V_B}(2,1),$$

$$\sigma_{V_B}(2,3) = \sigma_{V_B}(3,2), \text{ and}$$

$$\sigma_{V_B}(1,3) = \sigma_{V_B}(3,1).$$

Similarly
$\sigma_{V_K}(1)^2$, $\sigma_{V_K}(2)^2$, $\sigma_{V_K}(3)^2$ represent the kinetic kill vehicle filter velocity error variance in x, y, and z respectively,
$\sigma_{V_K}(1,2)$, $\sigma_{V_K}(2,3)$, $\sigma_{V_K}(1,3)$ represent the ballistic object filter velocity error cross-covariance for xy, yz, and xz respectively.

The covariance terms above represent filter velocity errors associated with the ballistic object B and kinetic kill vehicle K respectively. Each of these covariance terms are used in the calculation of the terms $\sigma_R^2$ and $C_{V_M}$ given by $$C_{V_M} = \begin{pmatrix} \sigma_{V_M}(1)^2 & \sigma_{V_M}(1,2) & \sigma_{V_M}(1,3) \\ \sigma_{V_M}(2,1) & \sigma_{V_M}(2)^2 & \sigma_{V_M}(2,3) \\ \sigma_{V_M}(3,1) & \sigma_{V_M}(3,2) & \sigma_{V_M}(3)^2 \end{pmatrix}.$$ Furthermore, $$\vec{\hat{r}}_B = \frac{\vec{r}_B}{|\vec{r}_B|}, \text{ and}$$

$$\vec{\hat{r}}_K = \frac{\vec{r}_K}{|\vec{r}_K|}$$

with $\vec{r}_B, \vec{r}_K$ being the position vectors of the incoming ballistic object B and the kinetic kill vehicle K. The position vectors are defined by $\vec{r}_B = (X_B, Y_B, Z_B)$, and $\vec{r}_K = (X_K, Y_K, Z_K)$.

$$\sigma^2_{\dot{r}_B}, \sigma^2_{\dot{r}_K}$$

are the filter range rate error variances for the incoming ballistic object B and the kinetic kill vehicle K.

$$\sigma^2_{\dot{a}ng_B}, \sigma^2_{\dot{a}ng_K}$$

are the filter angle rate error variances for the incoming ballistic object B and the kinetic kill vehicle K.

The filter noise reductions for the incoming ballistic object B are given by $$\sigma^2_{\dot{r}_B} = 3\left(\frac{1}{2}\right)^{\frac{3}{5}} T^{\frac{2}{5}} A_r^{\frac{6}{5}} \sigma^{\frac{4}{5}}_{r_{meas,B}}, \text{ and}$$

$$\sigma^2_{\dot{a}_B} = 3\left(\frac{1}{2}\right)^{\frac{3}{5}} T^{\frac{2}{5}} A_a^{\frac{6}{5}} \left(r_B \sigma_{\tilde{a}_{meas,B}}\right)^{\frac{4}{5}}$$

with

T=data rate, $A_r$=unmodeled acceleration in range for the incoming ballistic object B, $A_a$=unmodeled acceleration in angle for the incoming ballistic object B, ("unmodeled" herein refers to the kinematics of the incoming ballistic object B not being accounted for in the above kinematic equations of the incoming ballistic object B. Since the incoming ballistic object filter assumes constant velocity motion, acceleration is not modeled.), $r_B$=range to the incoming ballistic object B, $\sigma_{r_{meas,B}}$=measured range error standard deviation for the incoming ballistic object B, $\sigma_{\tilde{a}_{meas,B}}$=measured angle error standard deviation for azimuth and elevation error (assume equal) for the incoming ballistic object B.

The filter noise reductions for the kinetic kill vehicle K are given by $$\sigma^2_{\dot{r}_K} = \frac{2\beta_r^2}{\alpha_r(4 - 2\alpha_r - \beta_r)T^2} \sigma^2_{r_{meas,K}}, \text{ and}$$

$$\sigma^2_{\dot{a}_K} = \frac{2\beta_a^2}{\alpha_a(4 - 2\alpha_a - \beta_a)T^2} \sigma^2_{\tilde{a}_{meas,K}} \text{ with}$$

$\alpha_r = 1 - \left(\frac{\tau_r}{\tau_r + T}\right)^2 \quad \beta_r = 2\left(\frac{T}{T + \tau_r}\right)^2$ Range filter gains $\alpha_a = 1 - \left(\frac{\tau_a}{\tau_a + T}\right)^2 \quad \beta_a = 2\left(\frac{T}{T + \tau_a}\right)^2$ Angle filter gains $\tau_r = T^{\frac{1}{5}} \left[\frac{3n\sigma_{r_{meas,K}}}{2A_{r,K}}\right]^{\frac{2}{5}} \quad \tau_a = T^{\frac{1}{5}} \left[\frac{3n\sigma_{\tilde{a}_{meas,K}} r_K}{2A_{a,K}}\right]^{\frac{2}{5}}$ Filter lag As the kinetic kill vehicle filter reduces noise, the filter lag can be a penalty of the noise reduction. If the kinetic kill vehicle's motion deviates from the kinematic equations described in the filter (i.e. kinetic kill vehicle acceleration), the lag manifests itself into position and velocity values being behind the actual values. $\tau_r$ and $\tau_a$ are the kinetic kill vehicle filter lag terms used to calculate the filter gains for range and angle respectively, where n=confidence factor, $r_K$=range to the kinetic kill vehicle K, $\sigma_{r_{meas,K}}$=measured range error standard deviation for the kinetic kill vehicle K, $\sigma_{\tilde{a}_{meas,K}}$=measured angle error standard deviation for azimuth and elevation error (assume equal) for the kinetic kill vehicle K, $A_{r,K}$=unmodeled acceleration in range for the kinetic kill vehicle K, and $A_{a,K}$=unmodeled acceleration in angle for the kinetic kill vehicle K, ("unmodeled" herein refers to the kinematics of the kinetic kill vehicle K not being accounted for in the above kinematic equations of the kinetic kill vehicle K. Since the incoming ballistic object filter assumes constant velocity motion, acceleration is not modeled.)

The radar senses the kinetic kill vehicle location by generating measurements in range and angle that have random errors given by the sensor measurement range and angle error standard deviation ($\sigma_{r_{meas,K}}$, $\sigma_{\tilde{a}_{meas,K}}$). The function of the filter is to reduce those errors at the expense of the filter lag associated with the objects actual motion and the filter kinematic equation describing the motion. The optimal filtering is the one that gives the least combined error between the random error reduction in the measurements and the occurrence of filter lag.

Next, in order to determine or set the threshold deflection angle value, the strike angle δ of the incoming ballistic object B and the kinetic kill vehicle K is calculated from the pre-collision track data by $$\delta = \cos^{-1}\left(\frac{\vec{V}_B \cdot \vec{V}_K}{|\vec{V}_B||\vec{V}_K|}\right).$$

Figure 3:
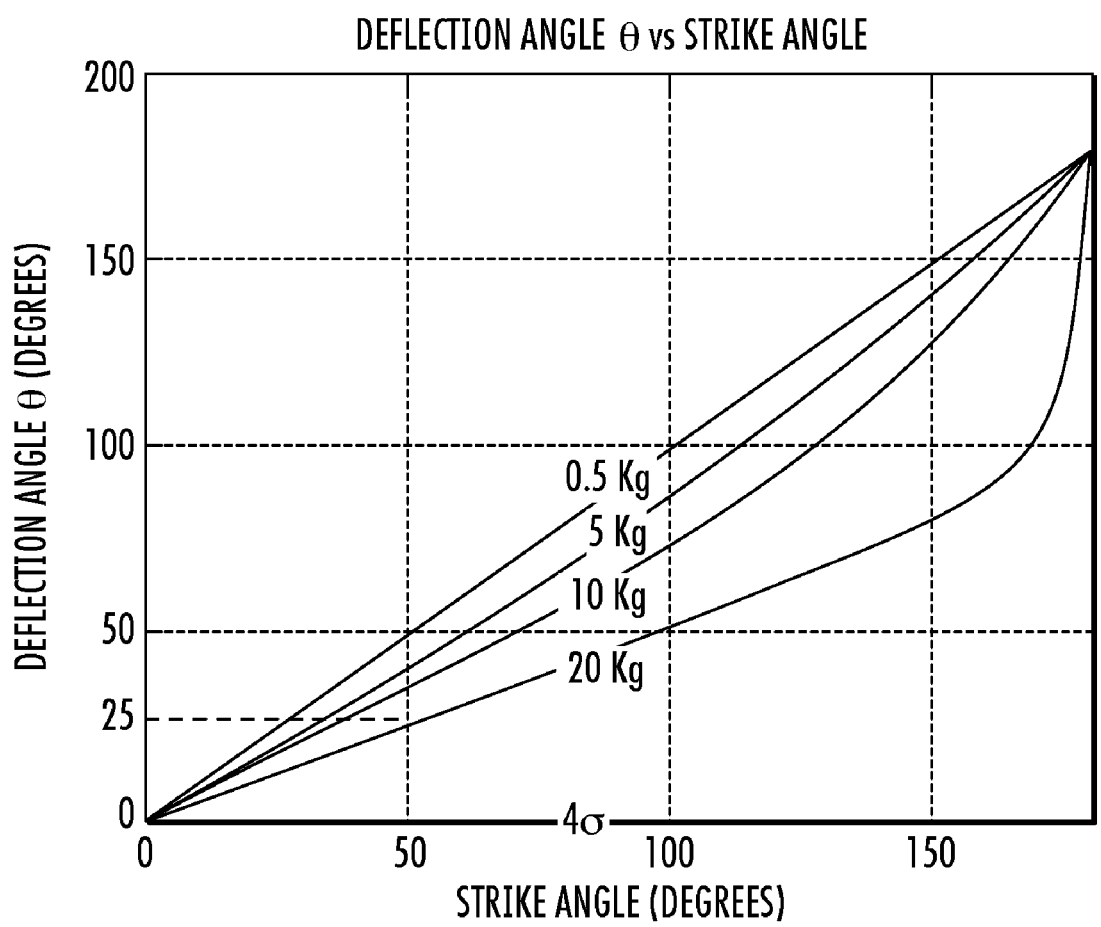
FIGS. 3 and 4 are plots showing the relationship between the deflection angle of the merged object vs. the strike angle between the kinetic kill vehicle and an incoming ballistic object when the two objects collide.
Figure 4:
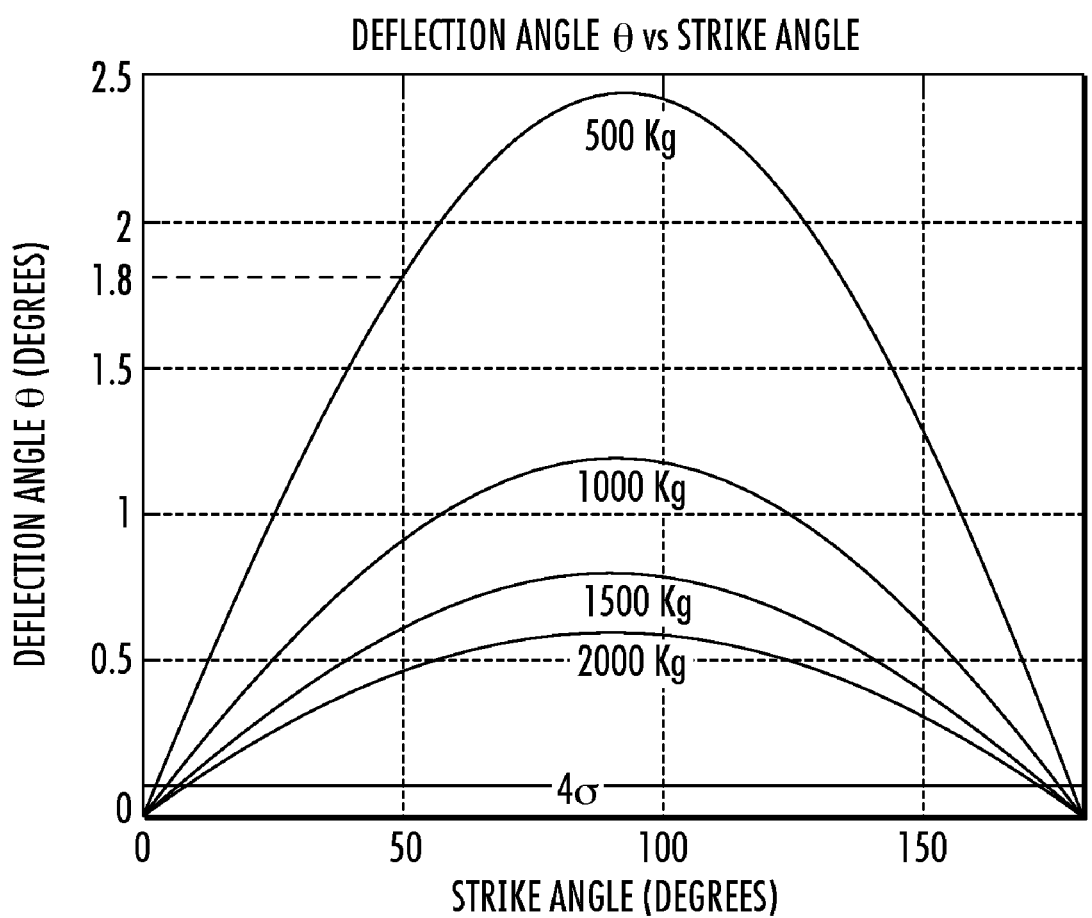

Then, the calculated strike angle δ is used in combination with the reference data shown in the plots of FIG. 3 or 4.

FIGS. 3 and 4 are plots showing the relationship between the deflection angle θ of the merged object M vs. the strike angle δ between the kinetic kill vehicle K and the incoming ballistic object B when the two objects collide. For this analysis, the kinetic kill vehicle K's weight was assumed to be 20 kg and the weight of the incoming ballistic object B was varied. In FIG. 3, plots are shown for cases where the incoming ballistic object B's weights are 0.5 kg, 5 kg, 10 kg, and 20 kg. In other words, these plots represent the kinetic kill vehicle K colliding with a "light" object, i.e. one of the decoys 21-26. FIG. 4 shows plots for cases where the incoming ballistic object B's weights are 500 kg, 1000 kg, 1500 kg, and 2000 kg. In other words, these plots represent the kinetic kill vehicle K colliding with a "heavy" object, i.e. a warhead. According to one embodiment of the present disclosure, the data representing the plots of FIGS. 3 and 4 can be stored in a data storage unit, such as in a look-up table format or in programmed formula, so that for a given strike angle δ calculated, a threshold angle value can be determined.

In one embodiment, after the strike angle δ is calculated, the strike angle and the stored data representing the plots of FIG. 3, for example is used to determine a threshold deflection angle $\delta_{threshold}$. Referring to FIG. 3, if the calculated strike angle δ is 50 degrees, the threshold deflection angle $\theta_{threshold}$ can be defined as 25 degrees, for example; which is the deflection angle corresponding to a 20 kg object colliding inelastically with the kinetic kill vehicle. Then, if the deflection angle θ of the merged object M calculated as discussed above is greater than or equal to 25 degrees, one can conclude that the incoming ballistic object B intercepted by the kinetic kill vehicle K was at most 20 kg and thus a "light" object. The conclusion will be that the incoming ballistic object B was one of the decoys and not a warhead. On the other hand, if the calculated deflection angle $\theta_{calculated}$ of the merged object M is less than 25 degrees, one can conclude that the incoming ballistic object B intercepted by the kinetic kill vehicle K was heavier than a weight class of maximum 20 kg. The conclusion will be that the incoming ballistic object B was either the heavy object 11 or the warhead 10.

In another embodiment, after the strike angle δ is calculated, the strike angle and the stored data representing the plots of FIG. 4, for example is used to determine a threshold deflection angle $\theta_{threshold}$. Looking at the plot of FIG. 4, if the calculated strike angle δ is 50 degrees, the threshold deflection angle $\theta_{threshold}$ can be defined as 1.8 degrees, for example, which is the deflection angle corresponding to a 500 kg object colliding inelastically with the kinetic kill vehicle. Then, if the calculated deflection angle $\theta_{calculated}$ of the merged object M is less than or equal to 1.8 degrees, we know that the incoming ballistic object B intercepted by the kinetic kill vehicle K was at least 500 kg and thus a "heavy" object. The conclusion will be that the incoming ballistic object B was the heavy object 11 or warhead 10 and not a decoy. On the other hand, if the calculated deflection angle θ of the merged object M is greater than 1.8 degrees, we know that the incoming ballistic object B intercepted by the kinetic kill vehicle K was lighter than a weight class of minimum 500 kg. The conclusion will be that the incoming ballistic object B was one of the decoys and not a warhead.

According to another aspect of the present disclosure, when there are more than two identifiable weight categories among the incoming ballistic objects, a series of threshold deflection angles $\theta_{threshold}$ can be employed to identify whether a desired warhead has intercepted different categories. For example, one such situation would be where the target complex 100 includes a heavy object 11 that is heavier than 2000 kg (i.e. heavier than the decoys 21-26 and the warhead 10), see FIG. 1, and the expected weight of the warhead 10 is greater than 20 kg but less than 2000 kg. Such heavy object 11 can be a tank, for example. Thus, in this example, the incoming ballistic objects can fall into one of three weight categories: (1) decoy weight class, (2) warhead weight class, and (3) other heavy object weight class.

In order to confirm whether or not the warhead 10 has been intercepted, two threshold deflection angles $\theta_{threshold\ one}$ and $\theta_{threshold\ two}$ can be defined. For purposes of this discussion, we will consider a case where the strike angle is 50 degrees. $\theta_{threshold\ one}$ can be set as 25 degrees, the deflection angle corresponding to a 20 kg object, as shown in FIG. 3. $\theta_{threshold\ two}$ can be set as 0.5 degrees, the deflection angle corresponding to a 2000 kg object, as shown in FIG. 4. After the strike angle δ of 50 degrees and a deflection angle $\delta_{calculated}$ are calculated from the radar track data of the colliding objects, the calculated deflection angle $\theta_{calculated}$ is compared to the $\theta_{threshold\ one}$. If $\theta_{calculated} < \theta_{threshold\ one}$, the radar system would conclude that the intercepted object was one of the decoys 21-26. In that situation, since the warhead 10 is still inbound, an appropriate follow-on action would be taken to address the incoming warhead 10. Another kinetic kill vehicle can be launched or a different countermeasure may be taken. If $\theta_{calculated} > \theta_{threshold\ one}$, the radar system would conclude that the intercepted object was not one of the decoys 21-26 because it was heavier than a decoy. However, at this point, it is not known whether the intercepted object was the warhead 10 or the other heavy object 11. Next, the calculated deflection angle $\theta_{calculated}$ is compared to the $\theta_{threshold\ two}$. If $\theta_{calculated} > \theta_{threshold\ two}$, it would mean that the intercepted object was heavier than the decoys but lighter than the heavy object 11 and the radar system would conclude that a heavy object was intercepted. If $\theta_{calculated} < \theta_{threshold\ two}$, the radar system would conclude that the intercepted object was not the warhead 10 but the other heavy object 11 and an appropriate follow-on action can be taken.

According to an aspect of the present disclosure, look-up tables or programmed formulae representing plots similar to those shown in FIGS. 3 and 4 can be prepared and stored in the radar system to accommodate kinetic kill vehicles of varying weights as well as different weight classes of decoys and warheads. Thus, by setting an appropriate threshold deflection angle $\theta_{threshold}$ and then comparing the calculated deflection angle $\theta_{calculated}$ against the threshold value, a radar system can quickly determine whether a warhead has been intercepted by the kinetic kill vehicle. Depending on the outcome, a decision can be made as to the appropriate follow-on action to be taken. For example, if the kinetic kill vehicle intercepted a decoy rather than a warhead, an appropriate follow-on action can be to launch another kinetic kill vehicle to intercept the warhead. If the kinetic kill vehicle intercepted a warhead, an appropriate follow-on action can be to track or scan for another target complex and launch another kinetic kill vehicle.

As can be understood from the discussion presented herein, the information about the weight of the warhead is known and that information is used to set the deflection angle threshold values accordingly.

Figure 5:
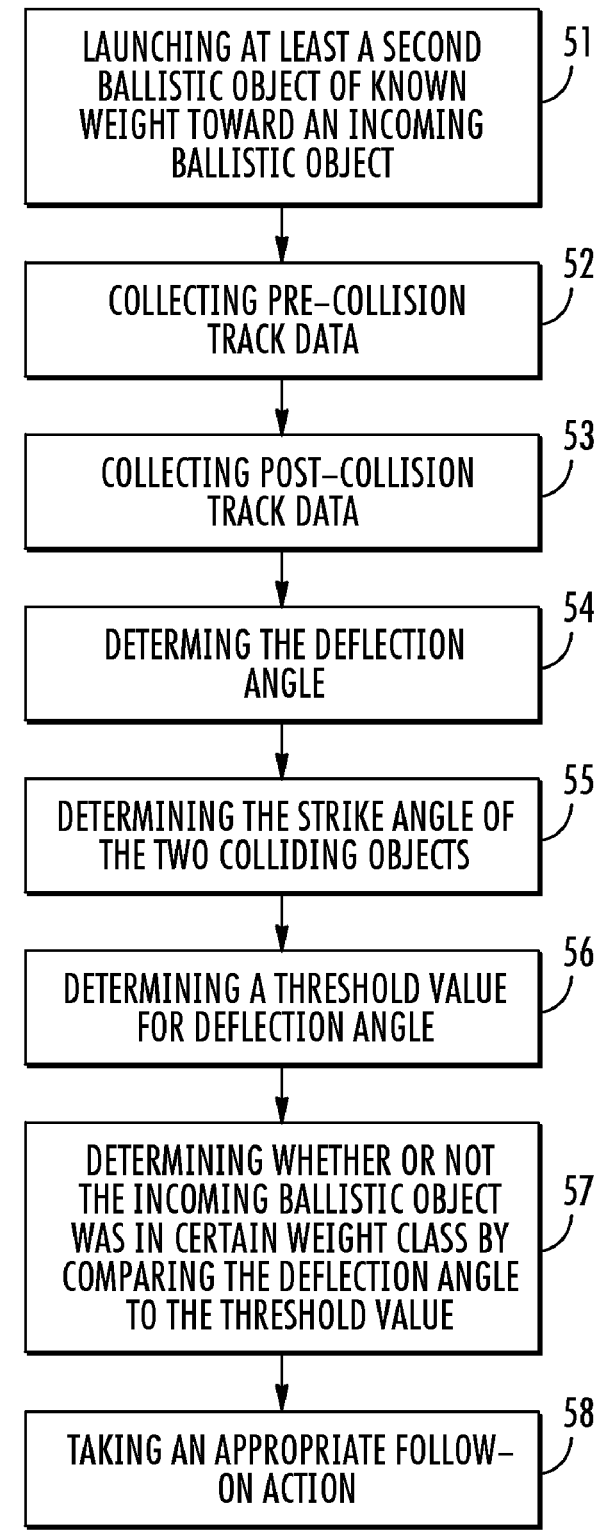
FIG. 5 is a flowchart illustrating the method of the present disclosure according to an embodiment.

FIG. 5 is a flowchart illustration of the method of the present disclosure according to an embodiment. After an incoming ballistic object in a ballistic target complex is identified by a radar system, at least a second ballistic object of a known weight is launched toward the incoming ballistic object (see Box 51), thereby resulting in the two objects colliding and producing a merged object traveling on a second ballistic trajectory that is deflected from the first ballistic trajectory of the ballistic object by a deflection angle. Immediately before the two objects collide, pre-collision track data comprising the velocity vectors of the incoming ballistic object and the second object is collected (see Box 52). Post-collision track data is collected after the collision (see Box 53), wherein the post-collision track data comprises the velocity vector information of the merged object. Next, the deflection angle of the second ballistic trajectory of the merged object is calculated from the pre-collision and post-collision track data (see Box 54) and the strike angle of the two objects is calculated from the pre-collision track data (see Box 55). Next, a threshold deflection angle is determined for the calculated strike angle (see Box 56), based on the expected deflection angles for the second ballistic object inelastically colliding with objects of various weight classes. Then, a determination is made as to whether or not the incoming ballistic object intercepted by the second ballistic object is in certain weight class by comparing the deflection angle with the threshold value (see Box 57). An appropriate follow-on action is taken (see Box 58) depending on the result.

Figure 6:
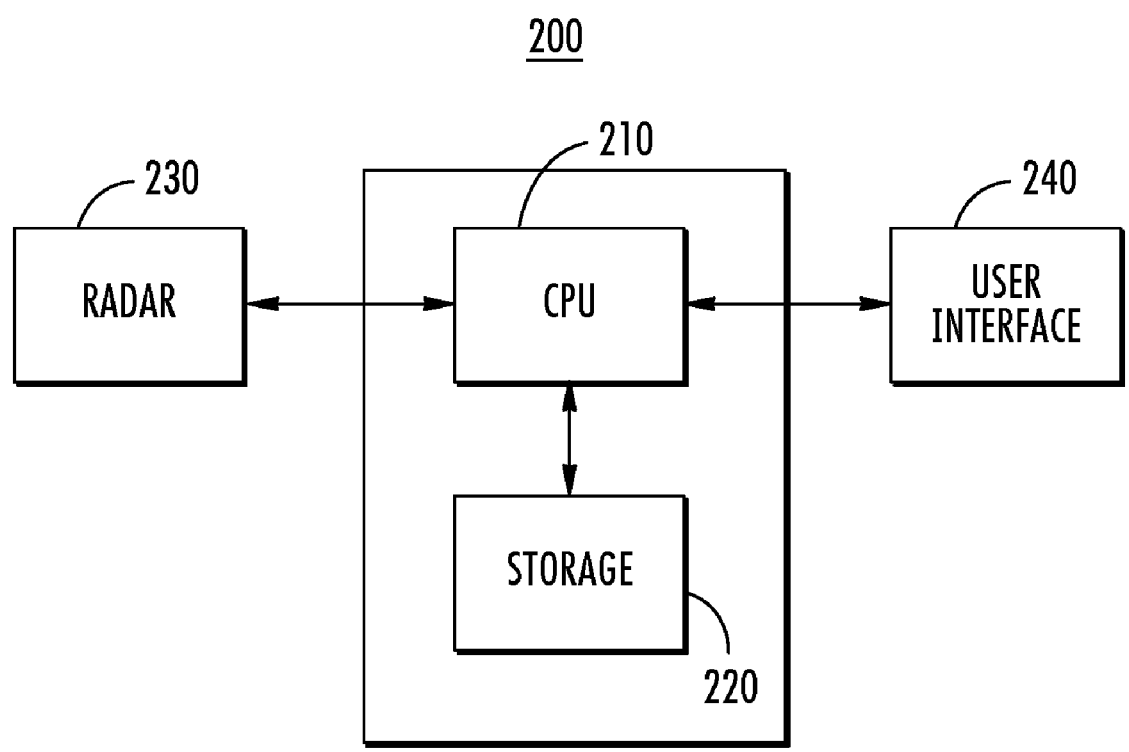
FIG. 6 is a schematic illustration of an example of a radar system according to an embodiment of the present disclosure.

Referring to FIG. 6, an example of a radar system 200 incorporating the method of the present invention is shown. The radar system 200 comprises a central processing unit 210 in which a computer coding embodying the method of the present invention is loaded and running. The radar system 200 can also comprise at least one data storage unit 220 that is in communication with the central processing unit 210 for storing information such as the data representing the plots of FIGS. 3 and 4 discussed above that is accessible to the central processing unit 210. The radar system 200 also comprises a radar unit 230 that is in communication with the central processing unit 210 that provides the pre-collision and post-collision track data discussed above. The radar system 200 also comprise a user interface 240 such as a display terminal that allows the user to view the radar tracking information and/or the output of the radar system 200 and enable a user to input any necessary information or control the operation of the radar system 200. The specific hardware that may comprise each of these components of the radar system 200 to implement the method of the present disclosure is well known to one of ordinary skill in the art.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claims is:

1. A method for determining the relative weight of an incoming ballistic object with respect to a predefined weight value, the incoming ballistic object moving in a first ballistic trajectory and the method comprising:
   launching at least a second object of a known weight toward the incoming ballistic object, thereby resulting in the two objects colliding at a strike angle and producing a merged object traveling on a second ballistic trajectory that is deflected from the first ballistic trajectory of the ballistic object by a deflection angle;
   collecting pre-collision track data, the pre-collision track data comprising velocity vectors of the incoming ballistic object and the second object immediately prior to the ballistic object and the second object colliding;
   collecting post-collision track data, the post-collision track data comprising observed filtered velocity vector of the merged object after the collision between the incoming ballistic object and the second object;
   determining the deflection angle of the second ballistic trajectory of the merged object based on the pre-collision and post-collision track data;
   determining the strike angle based on the pre-collision track data;
   determining a threshold value for the deflection angle based on the strike angle and said predefined weight value; and
   determining the relative weight of the incoming ballistic object by comparing the deflection angle with the threshold value.

2. The method of claim 1, further comprising taking an appropriate follow-on action based on the determination of the relative weight of the, incoming ballistic object.

3. The method of claim 1, wherein the known weight of the second object is substantially less than the weight of the incoming ballistic object.

4. The method of claim 3, wherein the step of determining the relative weight of the incoming ballistic object includes comparing the deflection angle with the threshold value and concluding that the incoming ballistic object was heavier than an expected weight class if the deflection angle is less than or equal to the threshold value.

5. The method of claim 3, wherein the step of determining the relative weight of the incoming ballistic object includes comparing the deflection angle with the threshold value and concluding that the incoming ballistic object was lighter than an expected weight class if the deflection angle is greater than or equal to the threshold value.

6. The method of claim 1, wherein determining the deflection angle of the second ballistic trajectory of the merged object based on the pre-collision and post-collision track data comprises calculating the deflection angle by $$\theta = \cos^{-1}\left(\frac{\vec{V}_M \cdot \vec{V}_B}{|\vec{V}_M||\vec{V}_B|}\right)$$

where θ is the deflection angle,
$\vec{V}_B = (V_B(1), V_B(2), V_B(3))$ is the velocity vector of the incoming ballistic object B at the collision,
$\vec{V}_K = (V_K(1), V_K(2), V_K(3))$ is the velocity vector of the second object K at the collision,
$\vec{V}_M = (V_M(1), V_M(2), V_M(3))$ is the observed filtered velocity vector of the merged object M after collision given by $$\vec{V}_M = \vec{V}_K W_B + \vec{V}_B W_K$$

with $$W_B = \frac{w_K}{w_B + w_K}, \text{ and}$$

$$W_K = \frac{w_B}{w_B + w_K},$$

where
$w_B$=weight of the incoming ballistic object B and
$w_K$=weight of the second object K.

7. A method for determining whether or not an incoming ballistic object moving in a first ballistic trajectory is a warhead that is substantially different than a predefined weight value, the method comprising:
   launching at least a second object of a known weight toward the incoming ballistic object, thereby resulting in the two objects colliding at a strike angle and producing a merged object traveling on a second ballistic trajectory that is deflected from the first ballistic trajectory of the ballistic object by a deflection angle;

collecting pre-collision track data, the pre-collision track data comprising velocity vectors of the incoming ballistic object and the second object immediately prior to the ballistic object and the second object colliding;

collecting post-collision track data, the post-collision track data comprising velocity vector of the merged object after the collision between the incoming ballistic object and the second object;

determining the deflection angle of the second ballistic trajectory of the merged object based on the pre-collision and post-collision track data;

determining the strike angle based on the pre-collision track data;

determining a threshold value for the deflection angle based on the strike angle and said predefined weight value; and determining whether or not the incoming ballistic object was a warhead by comparing the deflection angle with the threshold value.

8. The method of claim 7, further comprising taking an appropriate follow-on action based on the determination as to whether or not the incoming ballistic object was a warhead.

9. The method of claim 7, wherein the known weight of the second object is substantially less than the weight of the incoming ballistic object.

10. The method of claim 9, wherein the warhead is heavier than said predefined weight value and the step of determining whether or not the incoming ballistic object was a warhead includes comparing the deflection angle with the threshold value and concluding that the incoming ballistic object was a warhead if the deflection angle is less than or equal to the threshold value.

11. The method of claim 10, wherein taking the appropriate follow-on action comprises launching a third object toward another incoming ballistic object to intercept another warhead.

12. The method of claim 9, wherein the warhead is heavier than said predefined weight value and the step of determining whether or not the incoming ballistic object was a warhead includes comparing the deflection angle with the threshold value and concluding that the incoming ballistic object was not a warhead if the deflection angle is greater than or equal to the threshold value.

13. The method of claim 12, wherein taking the appropriate follow-on action comprises launching a third object toward another incoming ballistic object to intercept a warhead.

14. The method of claim 9, wherein determining the deflection angle of the second ballistic trajectory of the merged object based on the pre-collision and post-collision track data comprises calculating the deflection angle by $$\theta = \cos^{-1}\left(\frac{\vec{V}_M \cdot \vec{V}_B}{|\vec{V}_M||\vec{V}_B|}\right)$$

where $\theta$ is the deflection angle, $\vec{V}_B = (V_B(1), V_B(2), V_B(3))$ is the velocity vector of the incoming ballistic object B at the collision, $\vec{V}_K = (V_K(1), V_K(2), V_K(3))$ is the velocity vector of the second object K at the collision, $\vec{V}_M = (V_M(1), V_M(2), V_M(3))$ is the observed filtered velocity vector of the merged object M after collision given by $$\vec{V}_M = \vec{V}_K W_B + \vec{V}_B W_K$$

with $$W_B = \frac{w_K}{w_B + w_K}, \text{ and}$$

$$W_K = \frac{w_B}{w_B + w_K},$$

where $w_B$ = weight of the incoming ballistic object B and
$w_K$ = weight of the second object K.

* * * * *